No. 8,088.
G. FABER.
WATER GAGE FOR STEAM BOILERS.
PATENTED MAY 13, 1851.
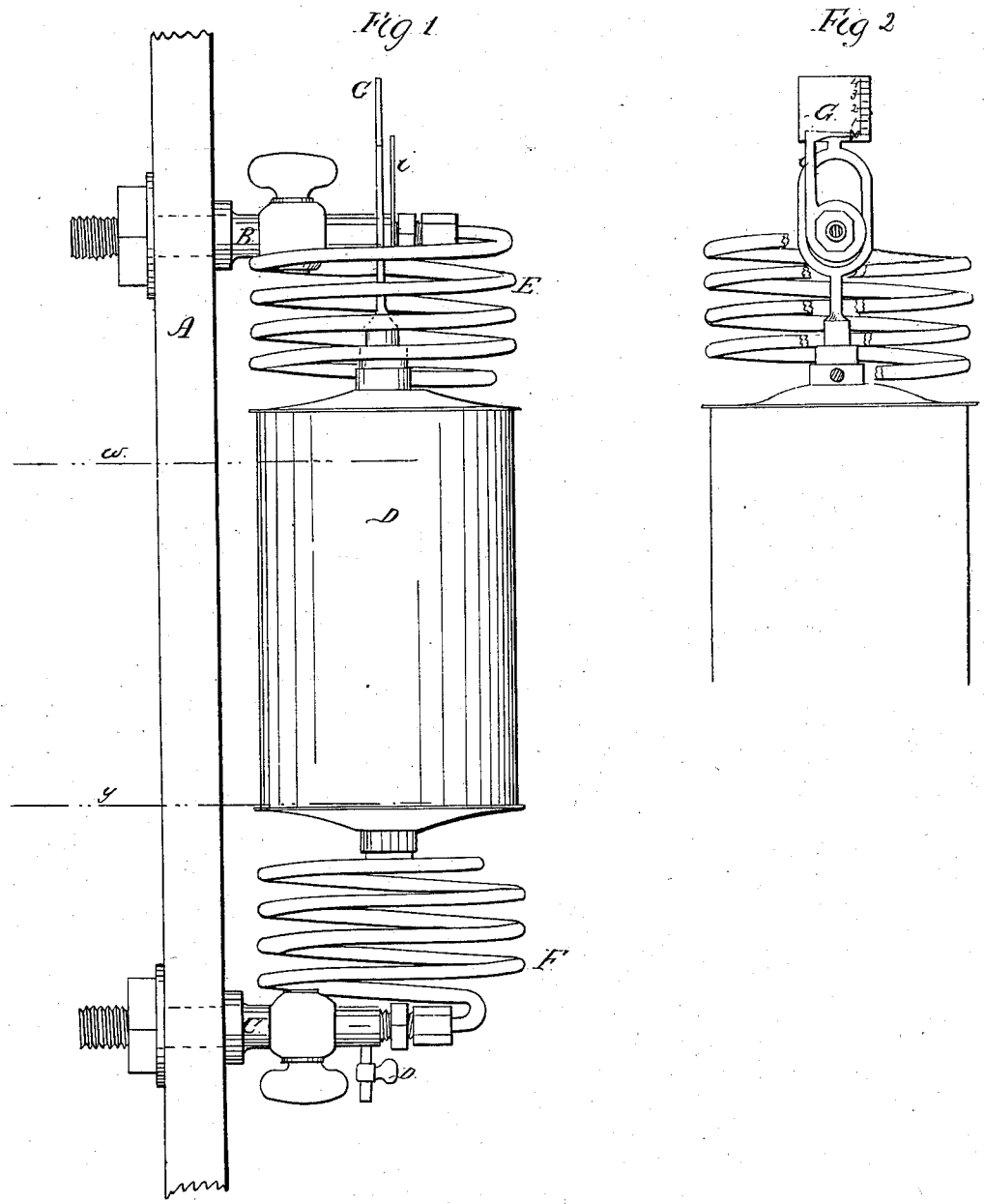

UNITED STATES PATENT OFFICE.

GEO. FABER, OF CANTON, OHIO.

APPARATUS FOR INDICATING THE HEIGHT OF WATER IN STEAM-BOILERS, &c.

Specification of Letters Patent No. 8,088, dated May 13, 1851.

*To all whom it may concern:*

Be it known that I, GEORGE FABER, of Canton, in the county of Stark and State of Ohio, have invented an Improvement in Water-Gages for Steam-Boilers; and I do hereby declare the following to be a full, clear, and exact description of the same, reference being had to the annexed drawings, making a part of this specification, in which—

Figure I is an elevation of the gage. Fig. II is a view of parts in detail and similar letters indicate similar parts in both figures.

My invention consists of a new and improved apparatus for ascertaining the height of water in steam boilers or other like vessels; that is to say if a chamber to be attached to some convenient part of the exterior surface of steam boilers, the said chamber to be connected so as to be in communication, by two openings leading to it, one at the top and the other at the bottom. The top opening is to be above the maximum height to which the water is to be at any time allowed to rise and the other opening to be below the extreme lowest point to which the water shall be permitted to fall. Thus it is intended that steam (when indicating for steam boilers) shall flow into the chamber at the top, while water shall always flow in at the bottom. The chamber (which is most convenient of a cylindrical form) is suspended at a short distance from the boiler between two helical springs composed of tubes, one leading to the top opening, and the other to that at the bottom. By this arrangement the quantity of water in the chamber is ascertained by the compression and expansion of the springs and therefore as the level of the water in the boiler and of that in the chamber will always be the same, a scale for indicating the quantity of water in the chamber by weight will enable the comparison to be instituted between it and the boiler, as will now be more fully explained.

Let A represent a section of the boiler or other vessel containing the liquid whose level is to be known by external indication; B, C, the communicating pipes with stop cocks; D, the chamber to contain the water to be measured, this is a cylinder of metal and must be strong enough to withstand any pressure the boiler may carry.

E, F are two tubes coiled to form spiral springs; one is to be attached to each end of the chamber D so as to form a communication with it; the chamber otherwise to be perfectly tight.

G is a scale attached to the top of the chamber D and rises and falls with it; ($i$) is a pointer affixed immovably to the end of the pipe B and points to the figures on the scale. The scale G is graduated to show the degree of compression and expansion the tubular springs will undergo while the chamber D is being filled with water.

The operation therefore is as follows: When the boiler has been filled with water to the point ($y$), which is at the lowest required stage, the chamber D will be empty; the springs in equilibrium; and the pointer ($i$) indicating zero as shown. Then gradually fill the boiler until the water attains the level ($w$), the water in the meantime filling the chamber D and by its weight causing the lower spring F to be compressed, and the upper one E to be expanded until the top of the chamber D stands on a level with the water line ($w$). The intermediate graduations showing all levels between ($y$) and ($w$).

To keep the tubes and chamber free from the deposit of sediment, a small blow off cock ($o$) is put at the bottom as shown, so that when there is a steam pressure within the boiler the cock (C) may be closed and cocks B and ($o$) opened when the steam will rush through the coils and chamber clearing them of any foreign matter which may have entered.

I have described the chamber as being combined with hollow spiral springs but it is evident that other forms may be substituted as zig-zag, &c., or the same effect would be produced by connecting the chamber to the ends of straight tubes projected so far as would afford sufficient leverage to spring the pipes by the weight of the water contained within the chamber.

What I claim as my invention and desire to secure by Letters Patent of the United States is—

The combination of the chamber D with the boiler or other vessel in which the height of fluids are to be measured, by means of tubes so formed and attached as to act as springs to indicate the weight of the water at any time within said chamber for the purpose and substantially in the manner herein set forth.

GEORGE FABER.

Witnesses:
 HARMAN STIDGER,
 Z. SNOW.